US006721319B1

(12) United States Patent
Amano et al.

(10) Patent No.: US 6,721,319 B1
(45) Date of Patent: Apr. 13, 2004

(54) NETWORK SYSTEM

(75) Inventors: Masaki Amano, Tokyo (JP); Shigeru Tatsuzawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/531,323

(22) Filed: Mar. 20, 2000

(30) Foreign Application Priority Data

Jul. 5, 1999 (JP) .......................................... 11-190651

(51) Int. Cl.[7] .............................................. H04L 12/28
(52) U.S. Cl. ...................................................... 370/390
(58) Field of Search ................................ 370/389, 390, 370/392, 446, 420, 434, 463, 401, 421, 407; 340/825.06; 709/250

(56) References Cited

U.S. PATENT DOCUMENTS 5,657,327 A * 8/1997 Hamada et al. ............. 370/389
6,101,191 A * 8/2000 Hashimoto et al. ......... 370/420
6,256,318 B1 * 7/2001 O'Callaghan et al. ...... 370/447
6,304,916 B1 * 10/2001 Iwatsuki et al. ............ 709/250

* cited by examiner

Primary Examiner—Chi Pham
Assistant Examiner—Alexander O. Boakye
(74) Attorney, Agent, or Firm—Venable LLP; Michael A. Sartori (57) ABSTRACT

A hub apparatus which has a plurality of ports for connecting a network portion including one or a plurality of communicating apparatuses and relays the transmission and reception of a communication packet between the communicating apparatuses through the ports. The hub apparatus has port information storing means for storing, every said port, port information regarding the network portion which includes at least information indicating whether the number of communicating apparatuses which the network portion connected to each port has is equal to 1 or a plural number, and means for determining communicating forms of transmission, non-transmission, and a state of the communication packet for transmitting on the basis of the port information corresponding to the port to which the communication packet is sent.

6 Claims, 9 Drawing Sheets

| PORT NO. | MAC ADDRESS |
|---|---|
| 1 | M24 |
| 1 | M25 |
| 2 | M26 |
| 3 | M27 |
|  |  |

FIG. 7B

| PORT NO. | MAC ADDRESS |
|---|---|
| 1 | M24 |
| 1 | M25 |
| 2 | M26 |
| 3 | M27 |
| 4 | M28 |

FIG. 8A

| PORT NO. | NETWORK IDENTIFIER |
|---|---|
| 2 | 0 |
| 3 | 0 |
|  |  |
|  |  |

FIG. 8B

| PORT NO. | NETWORK IDENTIFIER |
|---|---|
| 1 | 1 |
| 2 | 0 |
| 3 | 0 |
| 4 | 0 |

FIG. 9

NETWORK SYSTEM

BACKGROUND OF THE INVENTION

1. Field of the Invention

The invention relates to a network system such as a local area network system using Ethernet as a protocol.

2. Description of the Related Art

Figure 1:
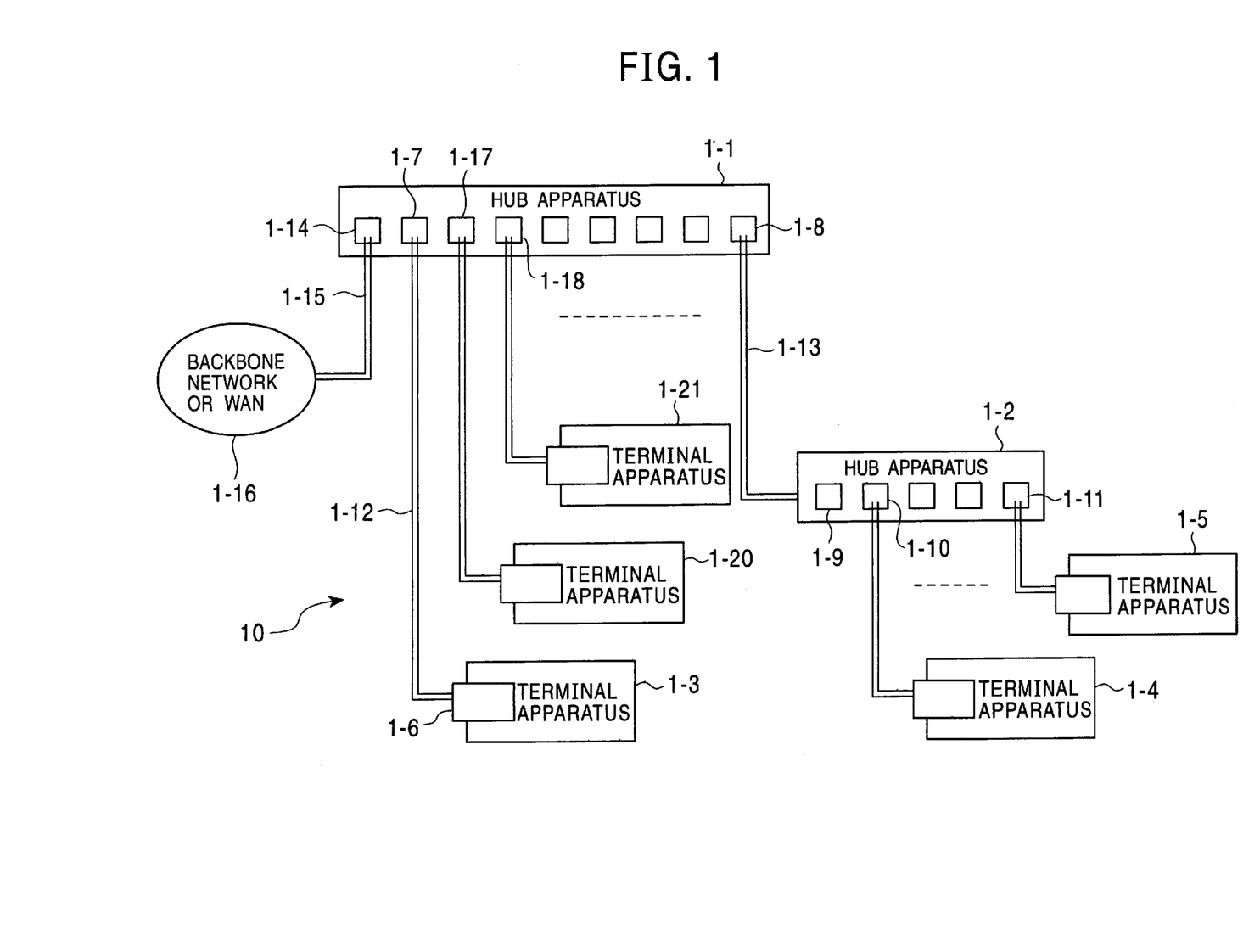
FIG. 1 is a diagram showing a conventional network system.

A constructional example of a conventional LAN system is shown in FIG. 1. The system of FIG. 1 is a network system 10 by an Ethernet LAN (or IEEE802.3 LAN) as a typical LAN.

In FIG. 1, hub apparatuses 1-1 and 1-2 and terminal apparatuses 1-3 to 1-5, 1-20, and 1-21 are connected through LAN cables and network connecting circuits.

For example, the hub apparatus 1-1 and terminal apparatus 1-3 are connected through an LAN cable 1-12 and a network connecting circuit 1-6. Although the network connecting circuit 1-6 is positioned in the terminal apparatus 1-3 in FIG. 1, it can be arranged out of the terminal apparatus 1-3.

The terminal apparatus 1-3 is connected to one port 1-7 of a plurality of ports 1-7, 1-8, 1-14, 1-17, 1-18, and so on disposed in the hub apparatus 1-1 through the network connecting circuit 1-6 and cable 1-12.

As for ports other than the port 1-7 which the hub apparatus 1-1 have, the port 1-8 is connected to a port 1-9 of the other hub apparatus 1-2 through an LAN cable 1-13. The ports 1-17 and 1-18 are connected to the other terminal apparatuses 1-20 and 1-21.

The terminal apparatuses 1-4 and 1-5 are connected to ports 1-10 and 1-11 of the hub apparatus 1-2 through cables and network connecting circuits in a manner similar to the connecting form between the terminal apparatus 1-3 and the hub apparatus 1-1. Thus, network expansion of a star type connection constructing system is realized.

As for the ports of the hub apparatus 1-1, there is also a port connected through a cable 1-15 to a backbone network 1-16 for connecting a plurality of LANs as shown by a port 1-14. The backbone network 1-16 can be replaced with another network such as a WAN (Wide Area Network) represented by an ISDN network or the Internet.

In the network construction of the conventional LAN system 10 as mentioned above, to expand the network and the connecting terminals, it is necessary to use hub apparatuses such as the apparatuses 1-1 and 1-2.

This is because in the LAN system 10, an apparatus which is connected to one port of the hub apparatus is limited to one terminal apparatus or one hub apparatus.

How a packet (namely, LAN packet data) is transmitted and processed between the terminal apparatuses will now described in the following.

The packet which is transmitted from the terminal apparatus usually includes an address, namely a transmission destination MAC (Media Access Control) address that is peculiar to the apparatus and used to identify a terminal apparatus on the transmission destination side and an address, namely transmitting source MAC address that is peculiar to the apparatus and used to identify the terminal apparatus on the transmitting source side.

When the terminal apparatus on the transmission destination side recognizes that the transmitted packet includes data referring to a value of an transmission destination MAC address, the transmission destination terminal apparatus receives the packet, so that a data transfer is executed between the terminal apparatuses.

As a hub apparatus for transmitting and processing the packet, there are mainly two kinds of apparatuses such as a non-switching hub apparatus and a switching hub apparatus.

The non-switching hub apparatus receives a packet transmitted from a terminal apparatus at one port of a plurality of ports and transmits the received packet to all of the ports other than the port (reception port) which supplied with the received packet, without referring to the MAC address included in the received packet.

To efficiently process a traffic of a network, in the switching hub apparatus, the correspondence relation between the MAC address of each terminal apparatus connected to the hub apparatus and each port is previously held in a buffer area called an address table.

A port on the transfer destination side is determined by referring to the transmission destination MAC address included in the packet transmitted from the transmitting source terminal apparatus and comparing it with the address table and the packet is transmitted only to the decided port (hereinafter, this process is called a switching process).

The data transmission to the ports other than the port concerned with the packet transmission can be prevented by the switching process.

A case where the hub apparatus 1-1 shown in FIG. 1 is a switching hub apparatus will now be considered. Even if the hub apparatus 1-1 is the switching hub apparatus, the hub apparatus 1-2 is not necessarily a switching hub apparatus.

For example, when the transmission destination MAC address in the packet transmitted from the terminal apparatus 1-3 is equal to the MAC address of the transmitting source terminal apparatus 1-3, the port (transmission port) to transmit the packet is equal to the reception port. Thus, the packet is abandoned in the switching hub apparatus 1-1.

There is a case where the packet data is transmitted from the terminal apparatus 1-4 connected to the port 1-10 of the hub apparatus 1-2 to the terminal apparatus 1-5 connected to the other port 1-11 of the hub apparatus 1-2. In the case, the transmission destination MAC address in the packet data is equal to the MAC address of the terminal apparatus 1-5.

Further, when the hub apparatus 1-2 is assumed to be a switching hub apparatus, the hub apparatus 1-2 transmits the packet only to the port 1-11 to which the terminal apparatus 1-5 is connected by the switching hub (switching process) function and does not transmit the packet to the port 1-9 connected to the hub apparatus 1-1.

In the case, when the hub apparatus 1-2 is a non-switching hub apparatus, the hub apparatus 1-2 transmits the packet to all of the ports other than the reception port by the hub function, so that the packet is also transmitted to the port 1-9.

The port 1-8 of the hub apparatus 1-1 is connected to the port 1-9 as mentioned above. In the hub apparatus 1-1 which received the packet by the port 1-8, it is recognized that the terminal apparatuses 1-4 and 1-5 are connected to the same port 1-8, and the transmission port is equal to the reception port, so that the packet is abandoned in the hub apparatus 1-1.

Now, assuming that the hub apparatus 1-1 has a function to turn back the received packet to the reception port (turnback transfer function), the hub apparatus 1-1 transmits the packet to the port 1-8.

The terminal apparatus 1-5, therefore, receives the packet which is transmitted via the hub apparatus 1-1 and the packet that is directly transmitted from the hub apparatus 1-2.

That is, the packet of the same contents is received twice and an overlap of the reception packet occurs.

It will be obviously understood that traffic of the hub apparatus 1-1 and the network which is concerned with the hub apparatus 1-1 increases.

The conventional switching hub apparatus, therefore, does not have the turnback transfer function to turn back the received packet to the reception port, and when it is recognized that the terminal apparatus having the transmitting source MAC address and the terminal apparatus having the transmission destination MAC address in the received packet are connected to the same port, the packet is abandoned in the switching hub apparatus.

Figure 2:
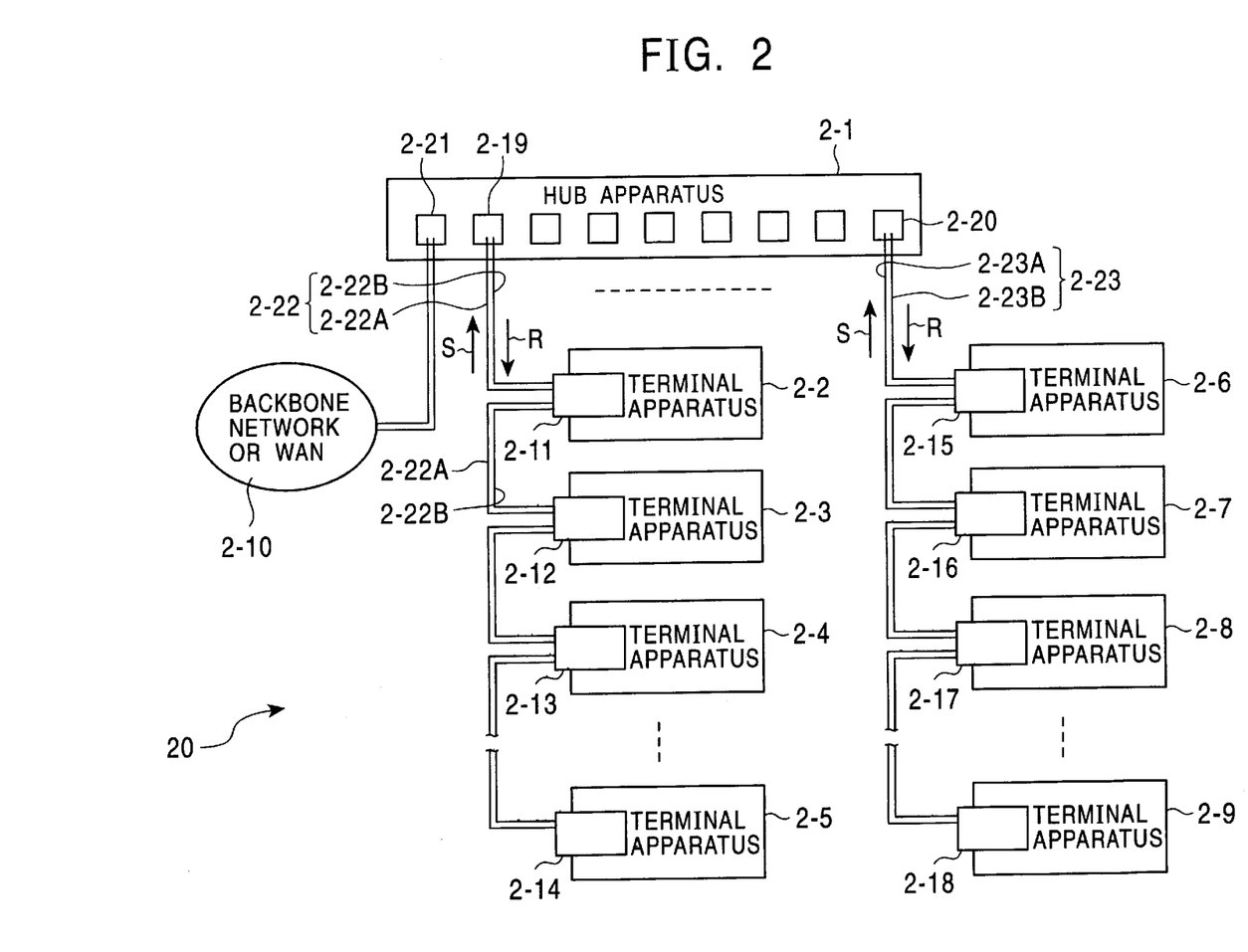
FIG. 2 is a diagram showing a conventional network system including cascade connected terminal apparatuses.

FIG. 2 shows an LAN system 20 having a connecting construction such that by cascade connecting a plurality of terminal apparatuses to one port of a hub apparatus, the network and the number of connecting terminals can be expanded without adding new hub apparatuses as mentioned above.

The LAN system 20 is disclosed in JP-A-10-190714.

In FIG. 2, in a hub apparatus 2-1 of the LAN system 20, terminal apparatuses 2-2, 2-3, 2-4, . . . , and 2-5 are cascade connected to a port 2-19 and terminal apparatuses 2-6, 2-7, 2-8, . . . , and 2-9 are also likewise cascade connected to a port 2-20. A backbone network 2-10 or the like is connected to a port 2-21 in a manner similar to the LAN system 10.

Network connecting circuits 2-11, 2-12, 2-13, . . . , 2-14, 2-15, 2-16, 2-17, . . . , and 2-18 serving as interfaces with the hub apparatus 2-1 are arranged in or out of the cascade connected terminal apparatuses, respectively.

In the LAN system 20, an LAN cable 2-22 for connecting the hub apparatus 2-1 and network connecting circuit 2-11 and connecting the network connecting circuits 2-11 to 2-14 is constructed by a pair cable (2-22A and 2-22B). An LAN cable 2-23 for connecting the hub apparatus 2-1 and network connecting circuit 2-15 and connecting the network connecting circuits 2-15 to 2-18 is also likewise constructed by a pair cable (2-23A and 2-23B).

That is, the cable 2-22 is a pair cable constructed by two cables, a cable 2-22A to transmit the packet in the direction for moving, for example, from the terminal apparatus 2-2 to the hub apparatus 2-1 (direction shown by an arrow S) and a cable 2-22B to transmit the packet in the direction for moving from the hub apparatus 2-1 to the terminal apparatus 2-2 (direction shown by an arrow R). The LAN cable 2-23 is also similarly constructed by a cable 2-23A for transmission in the direction S and a cable 2-23B for transmission in the direction R.

A twisted pair cable with a shield or a twisted pair cable without a shield can be used as the pair cable.

Each of the network connecting circuits 2-11 to 2-18 is a characteristic portion of the LAN system 20. Since internal constructions of the network connecting circuits 2-11 to 2-18 can be substantially identical, a construction around the network connecting circuits 2-11 and 2-12 will now be described with reference to FIG. 3.

Figure 3:
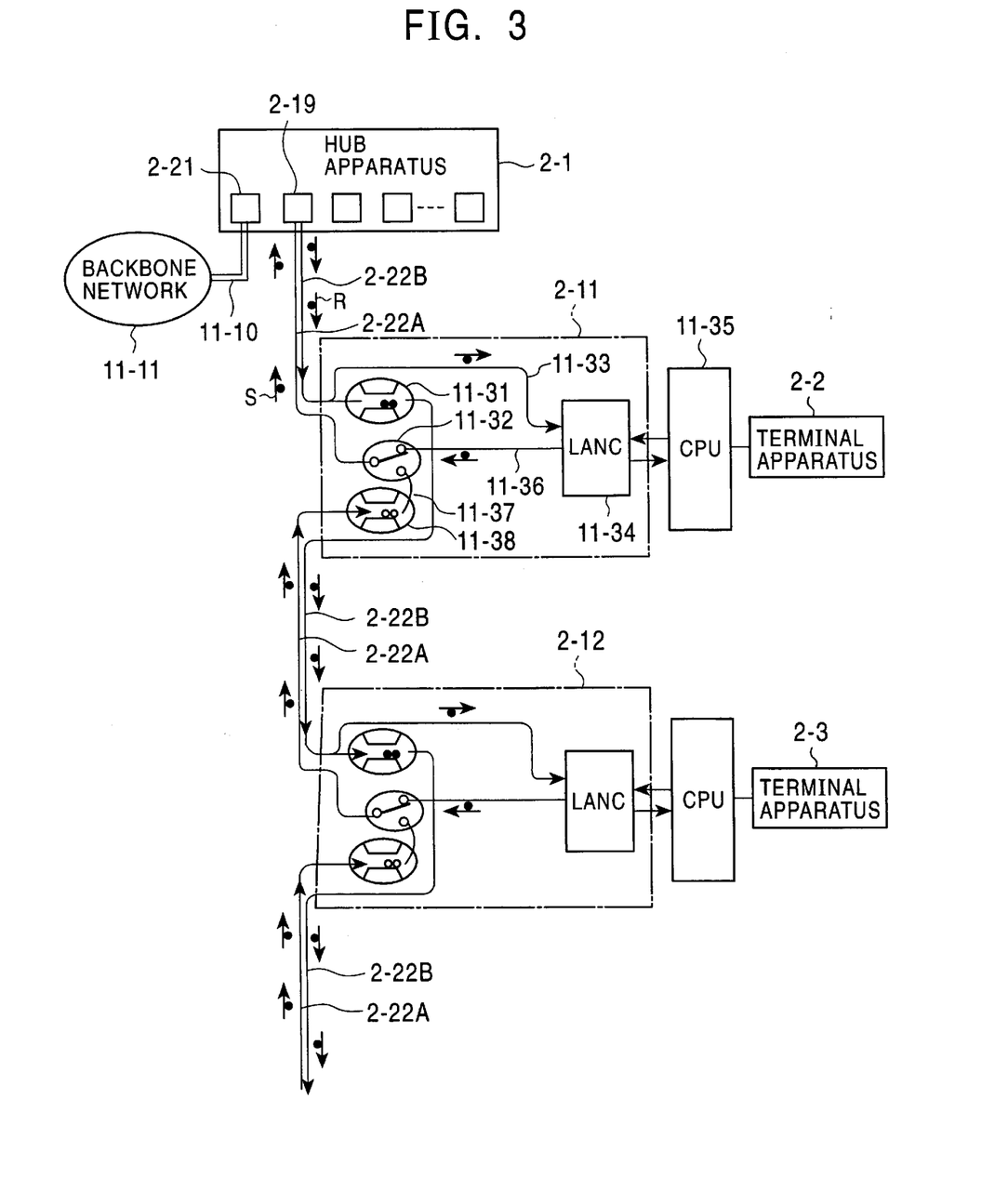
FIG. 3 is a diagram for explaining the operation of a network connecting circuit in the system of FIG. 2.

In FIG. 3, the network connecting circuit 2-11 has therein: an FIFO (memory of the first-in first-out type) 11-38 to store the packet in the direction of the arrow S; an FIFO 11-31 to store the packet in the direction of the arrow R; a change-over switch 11-32; and an LANC (Local Area Network Controller) 11-34. In the diagram, a central processing unit 11-35 is an information transmitting and receiving apparatus which transmits or receives data and operates on the basis of the data, and the LANC 11-34 is a circuit for controlling data transfer in the network connecting circuit 2-11.

The network connecting circuit 2-12 and its peripheral circuits also have a construction similar to that mentioned above.

In the case where, for example, the terminal apparatus 2-2 transmits a packet in the above construction, the change-over switch 11-32 in the network connecting circuit 2-11 selects an output terminal side of the LANC 11-34. The packet to be transmitted is sent to the cable 2-22A via the change-over switch 11-32 and transmitted on the cable 2-22A in the direction of the arrow S.

When the packet sent from the LANC corresponding to the cascade connected terminal apparatuses such as terminal apparatuses 2-3 to 2-5 or the like in the direction of the arrow S passes through the network connecting circuit 2-11, the packet is once stored in the FIFO 11-38 for transmission in the direction of the arrow S provided in the network connecting circuit 2-11. The reading operation, however, of the packet from the FIFO 11-38 is performed prior to the packet transmission from the terminal apparatus 2-2 via the LANC 11-34.

When the packet is read out from the FIFO 11-38, the change-over switch 11-32 connects an output terminal 11-37 of the FIFO 11-38 for transmission in the direction S to the cable 2-22A.

By the operation of the change-over switch 11-32, it is prevented that the packet transmitted from the terminal apparatus 2-2 and the packet transmitted from the terminal apparatus 2-3 or the like collide on the cable 2-22A.

The packet which is transmitted on the cable 2-22B in the direction of the arrow R is supplied to both an input terminal of the LANC 11-34 and an input terminal of the FIFO 11-31.

The LANC 11-34 progresses the receiving process with respect to only the packet to the self terminal (terminal apparatus 2-2) from a packet stream including all packets in the direction of the arrow R.

The packet supplied to the input terminal of the FIFO 11-31 for transmission in the direction R is subjected to a buffering of a predetermined amount by the FIFO 11-31 and, thereafter, sent to the cable 2-22B in the direction of the arrow R as it is, and supplied to the network connecting circuit 2-12 of the adjacent terminal apparatus 2-3.

Since each of the other network connecting circuits 2-12 to 2-18 or the like has a function similar to that of the network connecting circuit 2-11, even if they are cascade connected as shown in FIG. 2, each terminal apparatus can certainly transmit and receive a packet.

That is, the cascade connected terminal apparatuses 2-2, 2-3, 2-4, . . . , and 2-5 can transmit and receive the packet to/from the terminal apparatuses 2-6, 2-7, 2-8, . . . , and 2-9 connected to the other port 2-20 of the hub apparatus 2-1 and the terminal apparatus in the backbone network (or WAN or the like) 2-10.

Since the cascade connection between a plurality of terminal apparatuses can be realized by the LAN system 20 having the function as mentioned above, it is possible to easily cope with a new installation or addition of a terminal apparatus. As compared with the network construction of the LAN system 10 shown in FIG. 1, a greater number of terminal apparatuses can be connected to one hub apparatus.

In the network construction of the LAN system 20 in FIG. 2, however, the terminal apparatuses connected to the same cascade cannot transmit or receive the packet mutually.

That is, the packet transmitted from the terminal apparatus 2-2 is supplied to the port 2-19 in the same cascade as that of the terminal apparatus 2-2 and the hub apparatus 1-1 does not have the turnback transfer function, so that the other terminal apparatuses 2-3 to 2-5 in the same cascade cannot receive the packet.

The packet transmitted from the terminal apparatus 2-2 can be received by the terminal apparatuses arranged out of the same cascade, for example, the hub apparatuses 2-6 to 2-9 or the terminal apparatuses enclosed in the backbone network 2-10, or the like.

This point is also similarly applied to the packets transmitted from the other terminal apparatuses 2-3 to 2-5 in the same cascade and applied to another cascade, for example, a cascade having the terminal apparatuses 2-6 to 2-9.

In other words, this means that if the transmission destination MAC address of the packet transmitted from one of a plurality of terminal apparatuses in the same cascade indicates the other one of the plurality of terminal apparatuses, the packet cannot be received by any of the terminal apparatuses in the LAN system 20.

Although the problem can be solved by installing the turnback transfer function, a problem of an increase in traffic mentioned above occurs.

OBJECTS AND SUMMARY OF THE INVENTION

It is an object of the invention to provide a network system which enables transmission and reception of a packet to be performed among terminal apparatuses in the same cascade through a hub apparatus without an increase in traffic.

To solve the problem, there is provided a hub apparatus which has a plurality of ports for connecting a network portion including one or a plurality of communicating apparatuses and relays transmission and reception of a communication packet between the communicating apparatuses through those ports. The hub apparatus has port information storing means for storing, every said port, port information regarding the network portion which includes at least information indicating whether the number of communicating apparatuses which the network portion connected to each port has is equal to 1 or a plural number, and means for determining communicating forms of transmission, non-transmission, and a state of the communication packet for transmitting on the basis of the port information corresponding to the port to which the communication packet is sent.

There is provided a network system comprising: a hub apparatus; and a communicating apparatus constructing a network portion connected to each port of the hub apparatus.

DETAILED DESCRIPTION OF THE PREFERRED EMBODIMENT

Figure 4:
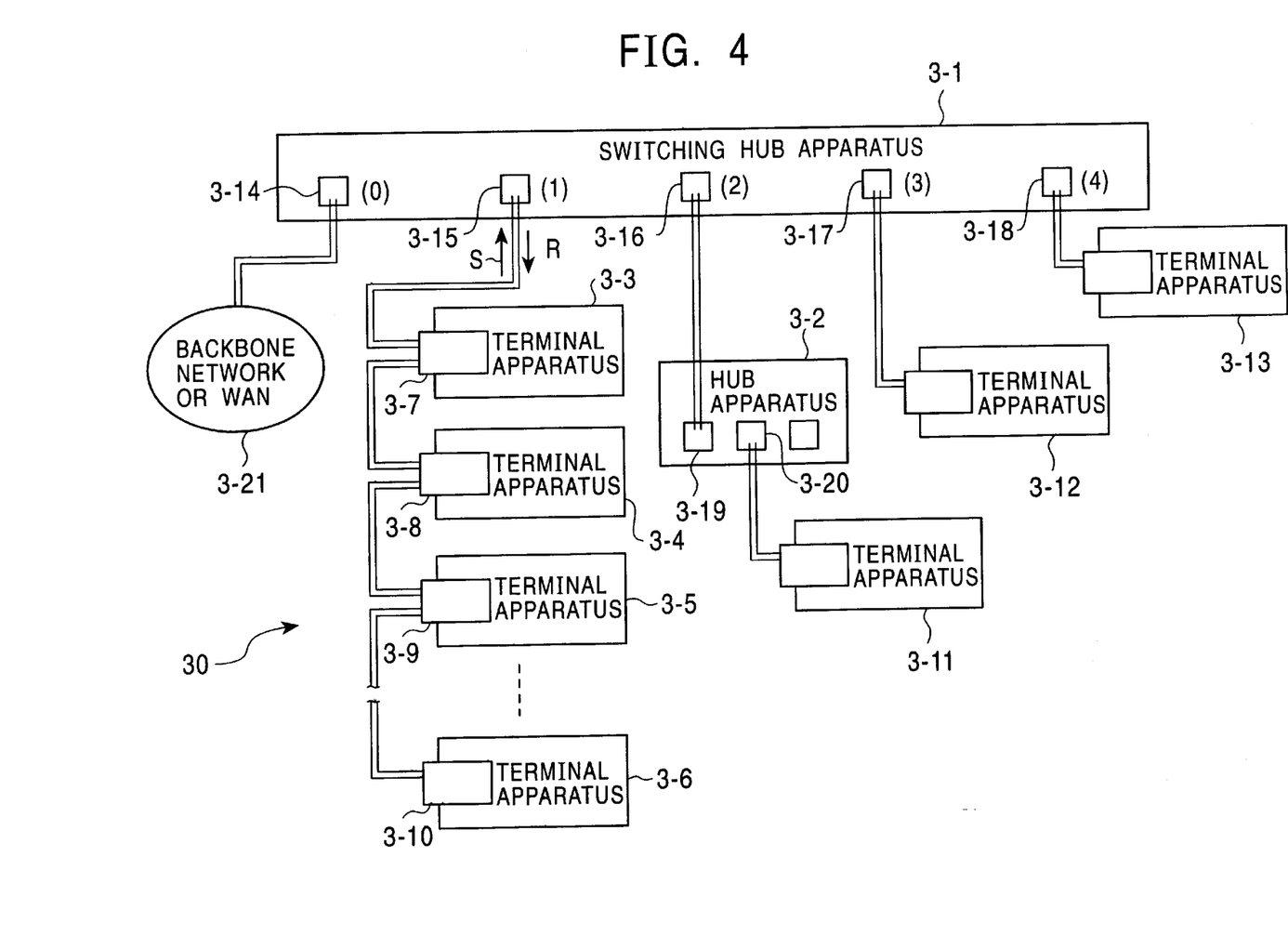
FIG. 4 is a diagram showing a network system to which the invention is applied.
Figure 5:
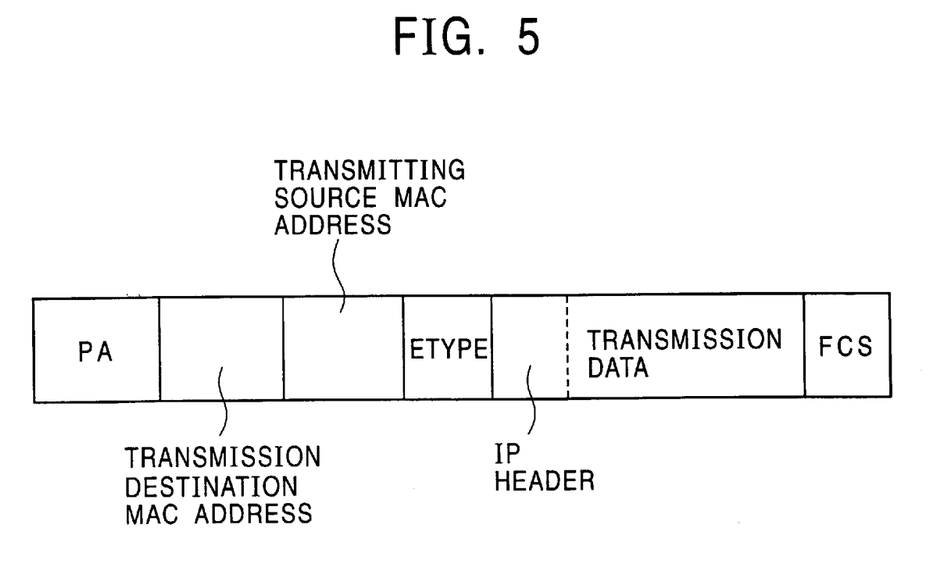
FIG. 5 is a diagram showing a format of packet of an Ethernet LAN.

A whole construction of an LAN system 30 according to the invention is shown in FIG. 4. It is assumed that physical conditions such as connection cables and a format of packet data to be transferred are specified by an Ethernet LAN (or IEEE802.3 LAN) as shown in FIG. 5. For example, each connection cable is constructed by a pair of the cable for transmission in the direction S and the cable for transmission in the direction R as shown in the LAN cable 2-22 in FIG. 2.

The format shown in FIG. 5 comprises a PA (preamble) indicative of the head of the packet, a transmission destination MAC address and a transmitting source MAC address, an ETYPE (Ethernet type) showing what protocol an upper protocol is, transmission data, and an FCS (Frame Check Sequence) to detect errors of the packet, in order from the left end. The PA consists of 8 bytes. The transmission destination MAC address consists of 6 bytes. The transmitting source MAC address consists of 6 bytes. The ETYPE consists of 2 bytes. The FCS consists of 4 bytes.

An IP header (4 bytes) is positioned at the beginning portion in the transmission data. An IP address, which will be explained hereinlater, exists in the IP header.

A switching hub apparatus 3-1 shown in FIG. 4 has five ports 3-14 to 3-18 for expansion of the network. Port numbers "0" to "4" are allocated to the five ports 3-14 to 3-18 in order, respectively.

A backbone network (can be exchanged for a WAN or the like) 3-21 is connected to the port 3-14 having the port No. "0" among them. A terminal apparatus 3-12 is connected to the port 3-17 having the port No. "3." A terminal apparatus 3-13 is connected to the port 3-18 having the port No. "4."

The terminal apparatuses 3-12 and 3-13 are star type terminal apparatuses corresponding to a star type network connecting system. Terminal apparatuses 3-3 to 3-6 are cascade type terminal apparatuses corresponding to a cascade type network connecting system.

Further, the terminal apparatuses 3-3, 3-4, 3-5, . . . , and 3-6 are connected to the port 3-15 having the port No. "1" through network connecting circuits 3-7 to 3-10 by a cascade LAN connecting system like the port 2-19 or 2-20 shown in FIG. 2. A hub apparatus 3-2 is connected to the port 3-16 having the port No. "2."

The LAN system 30 has an LAN network construction in which the elements of the double-stage connection of the hub apparatuses in the LAN system 10 in FIG. 1 and the elements of the cascade connection in the LAN system 20 in FIG. 2 mixedly exist.

A construction of each of a plurality of network connecting circuits 3-7 to 3-10 is substantially identical and all of them have the same construction as that of the network connecting circuit 2-11 in FIG. 3 mentioned above.

Figure 6:
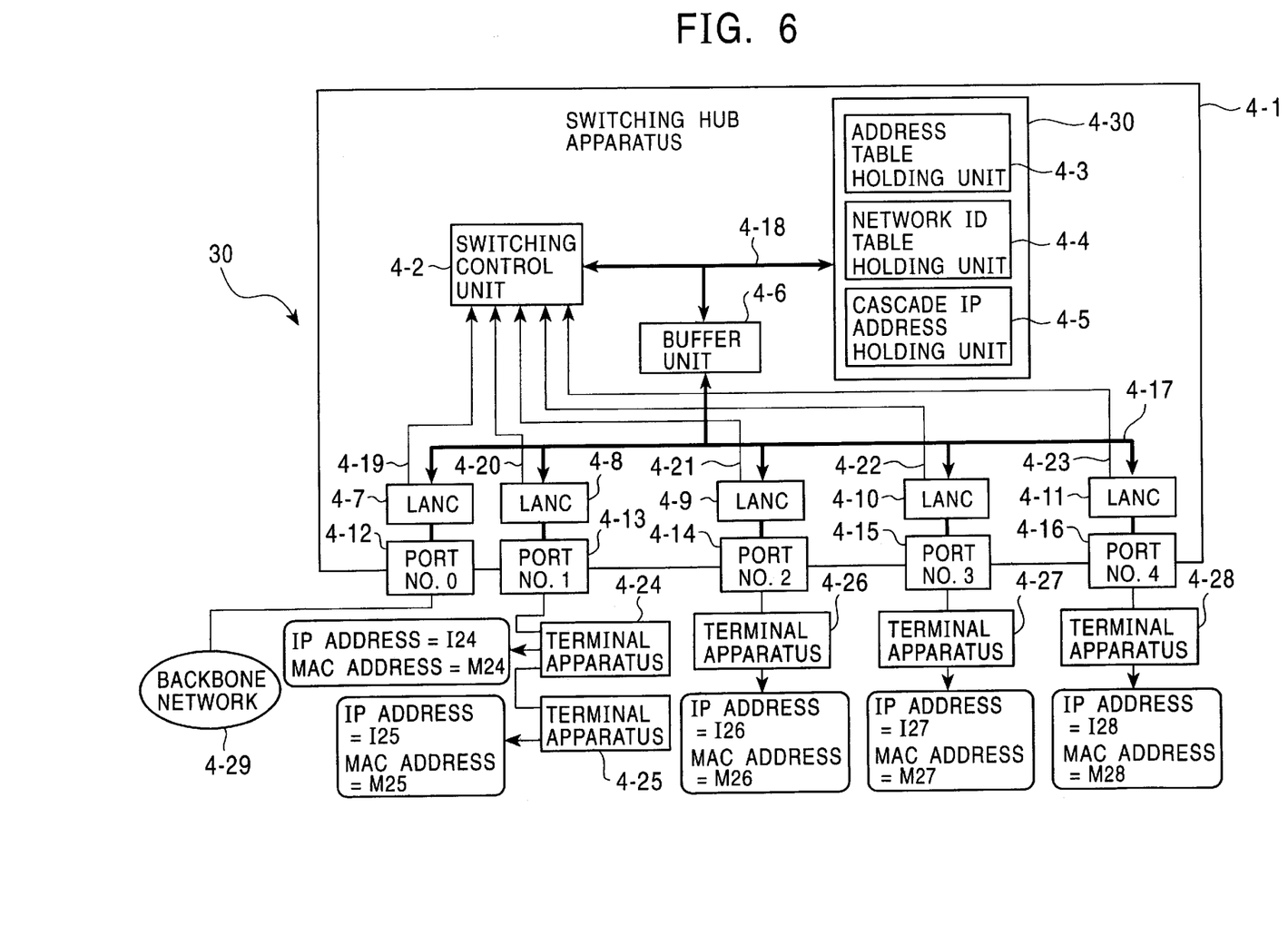
FIG. 6 is a block diagram showing an internal structure of a switching hub apparatus.

FIG. 6 shows an internal construction of the switching hub apparatus.

In FIG. 6, a switching hub apparatus 4-1 corresponds to the switching hub apparatus 3-1 in FIG. 4.

The switching hub apparatus 4-1 has connecting ports 4-12 to 4-16 for connecting terminal apparatuses and the other hub apparatuses. The port 4-12 corresponds to the port 3-14, the port 4-13 corresponds to the port 3-15, the port 4-14 corresponds to the port 3-16, the port 4-15 corresponds to the port 3-17, and the port 4-16 corresponds to the port 3-18, respectively.

Among them, the connecting targets to be connected to the ports 4-12 to 4-16 via the LAN cables are the same as those in the LAN system 30.

That is, a backbone network 4-29 corresponding to the backbone network 3-21 is connected to the port 4-12. Terminal apparatuses 4-24 and 4-25 (where, the number of terminal apparatuses which are cascade connected is set to 2) corresponding to the terminal apparatuses 3-3 to 3-6 are connected to the port 4-13. One terminal apparatus 4-27 corresponding to the terminal apparatus 3-12 is connected to the port 4-15. One terminal apparatus 4-28 corresponding to the terminal apparatus 3-13 is connected to the port 4-16.

Although the hub apparatus 3-2 is connected to the port 3-16 in FIG. 4, one terminal apparatus 4-26 is connected to the port 4-14 corresponding to the remaining port 3-16 in FIG. 6. The contents of the processes in the switching hub apparatus 4-1 are not changed due to this difference.

In the embodiment, MAC addresses of the terminal apparatuses 4-24, 4-25, 4-26, 4-27, and 4-28 are assumed to be M24, M25, M26, M27, and M28, respectively.

Each LANC (LAN controller) 4-7 to 4-11 is provided for each of the ports 4-12 to 4-16 of the switching hub apparatus 4-1.

Although one LANC is provided for one port in the embodiment, among the LANCs, there is an LANC corresponding to a plurality of ports. In the case of using the LANC corresponding to a plurality of ports, it is not always necessary to arrange one LANC for one port.

The LANC is a circuit to control the generation and analysis of data of the Ethernet as mentioned above. The LANCs are connected to a central processing unit for performing processes of the upper protocol and controlled by the central processing unit as necessary.

All of the LANCs 4-7 to 4-11 are connected to a buffer unit 4-6 in which the reception packet (reception LAN packet data) is temporarily stored through an internal bus 4-17.

Further, the LANCs 4-7 to 4-11 are connected to a switching control unit 4-2 to control the switching operation through signal lines 4-19, 4-20, 4-21, 4-22, and 4-23.

The switching control unit 4-2 is connected to the buffer unit 4-6 and a holding unit 4-30 through an internal bus 4-18.

An address table holding unit 4-3, a network identification table holding unit 4-4, and a cascade IP address holding unit 4-5 are provided in the holding unit 4-30.

The address table holding unit 4-3 is a holding unit to hold an address table showing the correspondence relation between the port number that is referred to upon switching and the MAC address of the terminal apparatus connected to the port.

The network identification table holding unit 4-4 is a holding unit to hold a network identification table showing the correspondence relation between each port number and a network identifier to identify a network system to be connected to the port. The cascade IP address holding unit 4-5 is a holding unit to hold a cascade IP address table (not shown) showing an area of IP addresses which are allocated to terminal apparatuses corresponding to the cascade type LAN connection.

The switching control unit 4-2 is usually constructed by a microprocessor to control the switching operation, a program memory, a work memory, and the like.

The buffer unit 4-6 and holding unit 4-30 are generally constructed by a memory and a memory controller.

The buffer unit 4-6 can not only merely temporarily store the packet but also rewrite the contents of the stored packet as necessary.

The operation of the LAN system having the above construction will now be described.

Figure 7A:
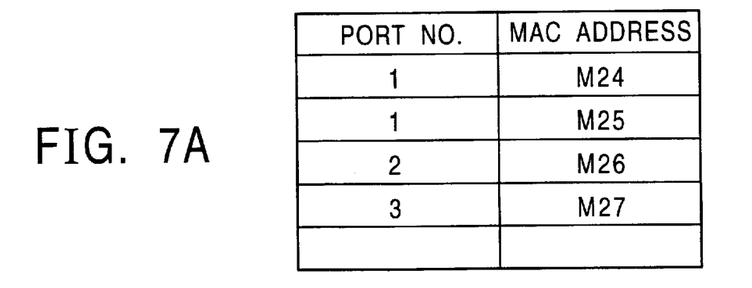
FIGS. 7A and 7B are diagrams showing address tables.

As shown in FIG. 7A, each address (MAC address) that is peculiar to the terminal apparatus connected to each port and each port number are registered and managed in the address table holding unit 4-3 in correspondence with each other.

That is, at the present time point, in the address table of FIG. 7A, the port No. "1" corresponds to M24 and M25 for the cascade connection, the port No. "2" corresponds to M26, and the port No. "3" corresponds to M27.

When the terminal apparatus 4-28 transmits a packet, the packet is first received by the port 4-16 (port No. "4") and the received packet is stored in the buffer unit 4-6 via the LANC 411.

Then, the switching control unit 4-2 extracts the transmitting source MAC address M28 in the received packet, and searches the address table in the address table holding unit 4-3 for M28.

As shown in FIG. 7A, since the MAC address M28 is not registered in the address table at the time point, the switching hub apparatus 4-1 which recognized it newly stores the information of the terminal apparatus 4-28, namely, the port No. "4" and the MAC address "M28" into each area in the address table so as to correspond to each other and additionally registers them.

Figure 7B:
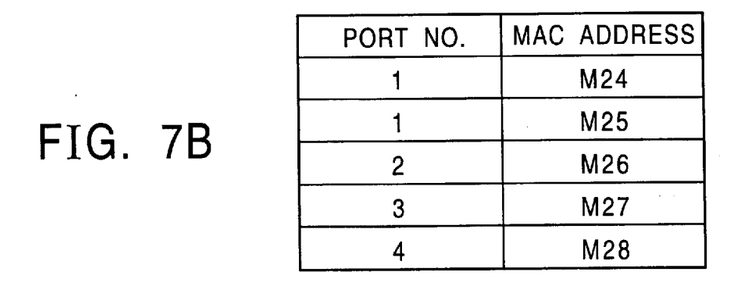

The address table changes from a state of FIG. 7A to a state of FIG. 7B by the additional registration.

The state of FIG. 7A is originally derived by repeating the similar additional registering operation.

The case of transmitting unicast LAN packet data (unicast packet) from the terminal apparatus 4-26 to the other terminal apparatus will now be described. The unicast packet is a packet in which the number of transmission destinations is equal to 1.

The unicast packet transmitted by the terminal apparatus 4-26 is first received by the port 4-14. The unicast packet is stored from the port 4-14 (port No. "2") into the buffer unit 4-6 via the LANC 4-9.

After the reception of the unicast packet, the switching control unit 4-2 searches a transmission port number from the address table on the basis of the transmission destination MAC address in the unicast packet and decides the transmission port number.

For example, now assuming that the transmission destination MAC address of the unicast packet is M27, since M27 corresponds to the port No. "3" in the table of FIG. 7B, the unicast packet is sent to the port 4-15 of the port No. "3". The unicast packet, therefore, is received only by the terminal apparatus 4-27 of the terminal apparatuses in the LAN system 30. Thus, the unicast is performed.

In the case, since the reception port number is equal to "2" and the transmission port number is equal to "3" and the reception port number and the transmission port number differ, the switching control unit 4-2 transfers the unicast packet to the transmission port 4-15. If the reception port number and the transmission port number are equal, however, the reception packet is abandoned in the switching hub apparatus 4-1 as shown in the prior art.

When the unicast packet is transmitted from the terminal apparatus 4-24 to the terminal apparatus 4-25 (they are arranged in the same cascade), however, according to the prior art, if only the relevant operation of the switching control unit 4-2 is performed, the unicast packet is abandoned and cannot reach the target terminal apparatus 4-25.

In the embodiment as well, since the system has the network connecting circuit construction of FIG. 3, there is not means for directly transmitting the packet from the terminal apparatus 4-24 to the terminal apparatus 4-25. Similarly, there is not means for directly transmitting a packet from the terminal apparatus 4-25 to the terminal apparatus 4-24.

In communications between the terminal apparatuses arranged in the same cascade, therefore, it is necessary that means for setting the same transmission port as the reception port (limited turnback transfer function), namely, means for turning back and transmitting a packet to the port which received the packet is provided in the switching hub apparatus 4-1.

For example, it is necessary to provide means for turning back a unicast packet received by the port 4-13 (port No. "1") and transmitting it to the port 4-13.

To realize the limited turnback transfer function, for example, the switching control unit 4-2 searches a transmission port number from the address table in accordance with the transmission destination MAC address in the unicast packet received by the port 4-13, determines the transmission port number, and transfers the unicast packet to the transmission port irrespective of a discrimination result about whether the reception port number and the transmission port number are equal or different.

When the terminal apparatus 4-26 transmits a multicast packet, the transmitted multicast packet is received by the port 4-14 (port No. "2") and the switching control unit 4-2 transfers it to all of the ports except for the reception port.

The multicast packet is generally a packet in which a plurality of selected transmission destinations are designated. Since the contents of the transmission destination MAC addresses of the multicast packet and those of the unicast packet differ from each other, the switching hub apparatus 4-1 can discriminate whether a received packet is a unicast packet or a multicast packet on the basis of the transmission destination MAC address of the received packet.

In the embodiment, as for the multicast packet, it is assumed that all terminal apparatuses in the LAN system 30 are selected as destinations of the multicast.

Even if the multicast packet can be transferred to all of the ports other than the reception port, in the case of transmitting a multicast packet from the terminal apparatus 4-24, the packet cannot be directly transmitted from the terminal apparatus 4-24 to the terminal apparatus 4-25 in a manner similar to the case of the above unicast packet.

The switching control unit 4-2, therefore, not only transfers the multicast packet received by the port 4-13 (port No. "1") to all of the ports other than the reception port but also changes the multicast packet to a unicast packet in which all of the terminal apparatuses other than the transmitting source terminal apparatus to be connected to the reception port are set to the transmission destination terminals, and transmits the unicast packet to the reception port. The problem in the transmission and reception of the multicast packet is solved.

Since a difference is provided for the switching process of the reception packet in dependence on whether the network to be connected to the transmission port or reception port is the network based on the cascade type LAN connecting system or not, it is necessary to classify the kind of network which is connected to each port to thereby determine whether it indicates the network by the cascade type LAN connecting system or not and hold its information (network connection information) into the switching hub apparatus 4-1.

The switching hub apparatus 4-1 performs a different packet switching operation in each of the unicast and the multicast on the basis of the network connection information held in the self apparatus.

A holding method of the network connection information, the unicast packet switching operation, and the multicast packet switching operation will now be described in detail hereinbelow as an example.

Figure 8A:
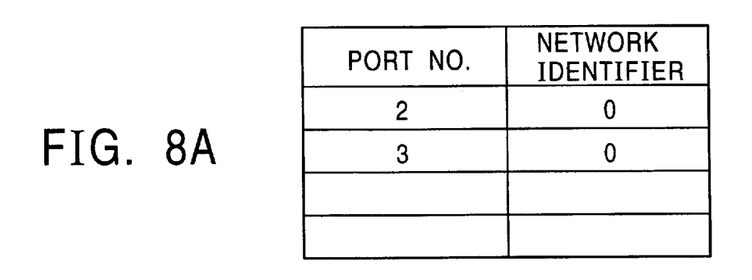
FIGS. 8A and 8B are diagrams showing network identification tables.

As an example of the holding means of the network connection information, the network connection information is registered in the network identification table shown in FIG. 8A in the network identification table holding unit 4-4.

Figure 8B:
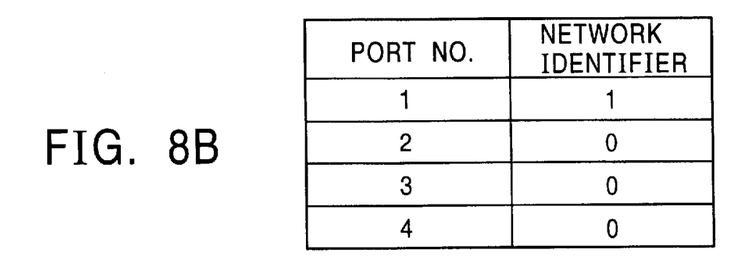

As shown in FIGS. 8A and 8B, when the network to be connected to a certain port is a network based on the cascade type LAN connecting system, "1" is stored in correspondence to the port number of the port. In the other cases, "0" is stored there.

To automatically form the network identification table as shown in FIGS. 8A and 8B by the switching hub apparatus 4-1, it is necessary that the switching hub apparatus 4-1 can identify whether a network system to be connected to each port is a network based on the cascade type LAN connecting system or not.

As an example of the network identifying means, there is a method whereby an area of another address which is allocated to a terminal apparatus corresponding to the cascade type LAN connection and peculiar to the apparatus and included in a packet (hereinafter, this address is referred to as an IP address) is assured and, when the transmitting source IP address of a received packet lies in the area, it is determined that the network by the cascade type LAN connecting system is connected to the reception port.

A network identifying procedure by the above method will now be described hereinbelow.

First, a network administrator sets the area of the IP address (hereinafter, referred to as a cascade IP address) for allocating to the cascade type LAN connection corresponding terminal into the cascade IP address table in the internal cascade IP address holding unit 4-5 through an interface with the outside. A setting method and specifications of the interface with the outside are not particularly limited here.

When the cascade IP address areas are assumed to be I1, I2, I3, . . . , and I25, the administrator allocates any of the cascade IP addresses I1 to I25 to the terminal apparatuses 4-24 and 4-25 in the case of FIG. 6.

For example, I24 is allocated to the terminal apparatus 4-24 and I25 is allocated to the terminal apparatus 4-25.

IP addresses out of the set cascade IP address areas have to be allocated to the terminals 4-26, 4-27, and 4-28 which do not correspond to the cascade type LAN connection.

It is now assumed that IP addresses I26, I27, and I28 are allocated to the terminal apparatuses 4-26, 4-27, and 4-28, respectively.

In the table of FIG. 8A, it will be understood that the information of the port 4-14 (port No. "2") and the port 4-15 (port No. "3") has already been registered. Both of the ports 4-14 and 4-15 are not connected to any network portion of the cascade type LAN connecting system. The table corresponds to that of the construction of the LAN system 30 in FIG. 6.

It is now assumed that a packet transmitted from the terminal apparatus 4-28 in FIG. 6 was received by the port 4-16 (port No. "4").

By the reception, the switching control unit 4-2 searches a network identifier from the network identification table by the reception port number. Since the reception port No. "4" is not registered in FIG. 8A, the switching control unit 4-2 obtains the transmitting source IP address I28 in the received packet extracted simultaneously with the MAC address extraction and searches the cascade IP address table.

Since the IP address I28 is not registered in the cascade IP address table, the switching control unit 4-2 determines that any network portion of the cascade type LAN connecting system is not connected to the port 4-16, newly stores the port No. "4"and network identifier (NW identifier) "0" into areas in the network identification table, and additionally registers them.

After that, when a packet transmitted from the terminal apparatus 4-24 is further received by the port 4-13 (port No. "1"), the switching control unit 4-2 searches a network identifier from the network identification table by the reception port number.

Since the reception port No. "1" is not registered in FIG. 8A, the switching control unit 4-2 searches whether the transmitting source IP address I24 extracted from the received packet has been registered in the cascade IP address table or not.

Since the IP address I24 has been registered in the cascade IP address table, the switching control unit 4-2 determines that a network portion of the cascade type LAN connecting system are connected to the port 4-13, newly stores the port No. "1" and network identifier "1" into respective areas so as to correspond to each other, and additionally registers them.

By the additional registration, the network identification table changes from the state of FIG. 8A to the state of FIG. 8B.

Figure 9:
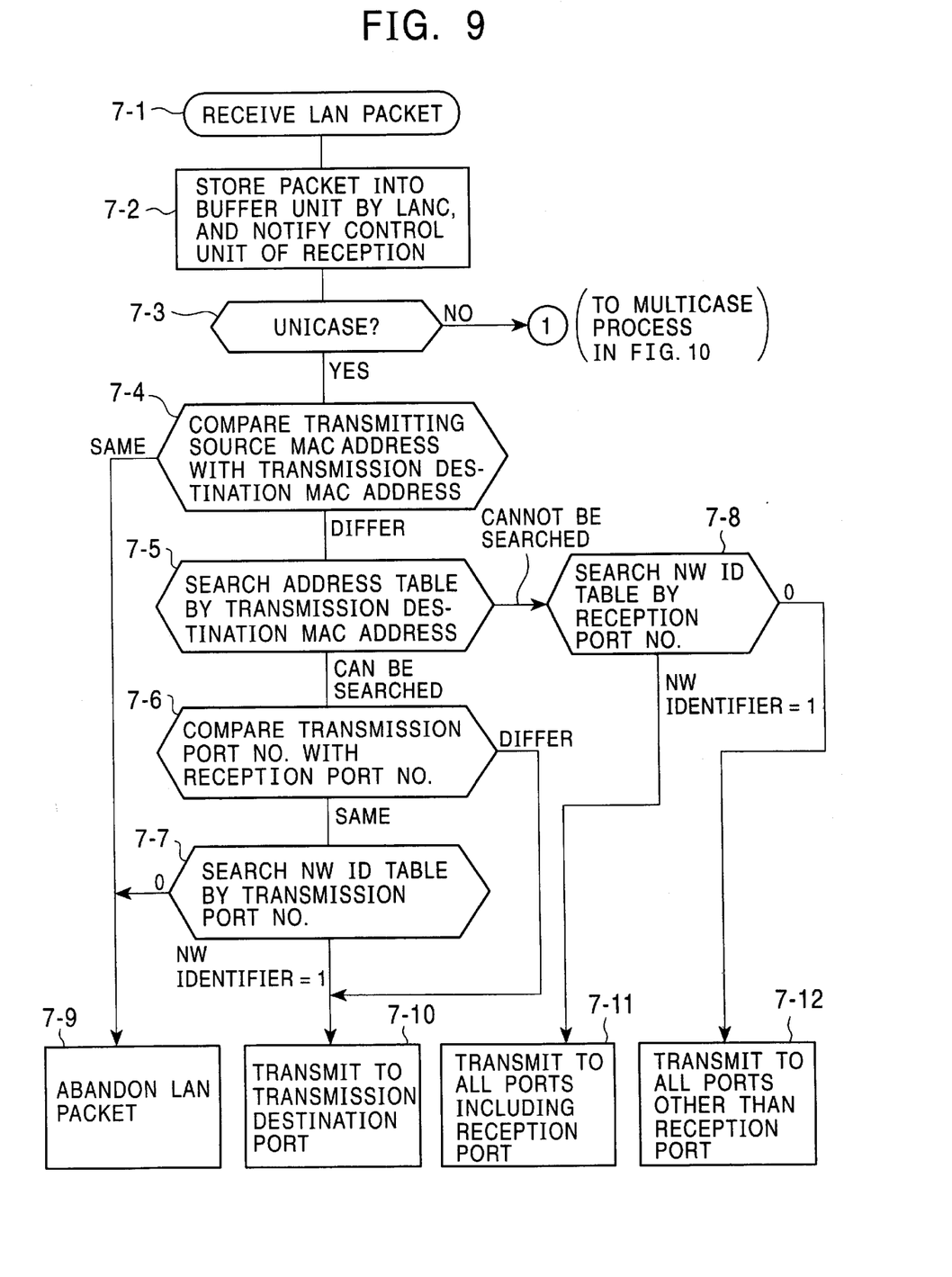
FIG. 9 is a flowchart showing the operation of the switching hub apparatus.
Figure 10:
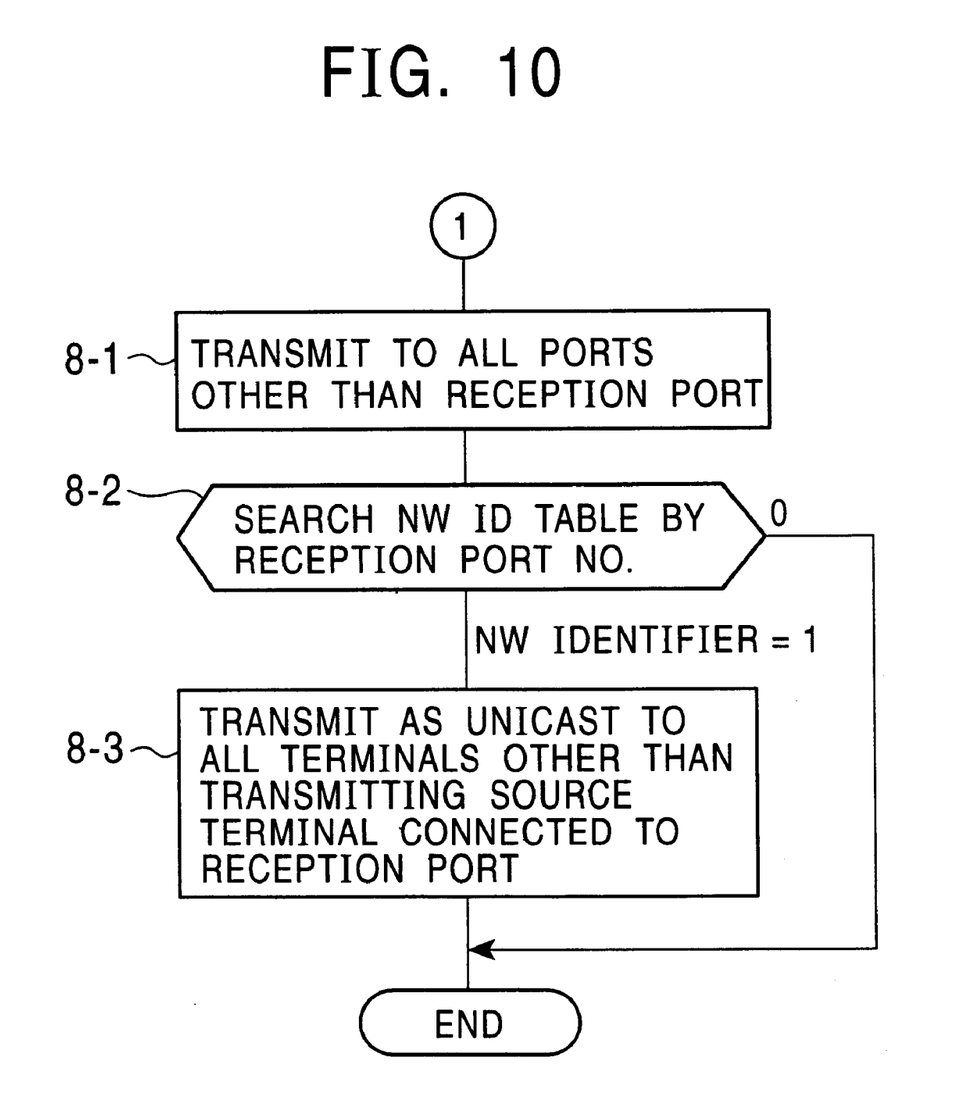
FIG. 10 is a flowchart showing a continuation portion of the operation of the switching hub apparatus of FIG. 9.

The whole operation of the switching hub apparatus 4-1 will now be described in detail with reference to flowcharts of FIGS. 9 and 10. The flowchart of FIG. 10 represents a portion branched from a processing flow of FIG. 9. FIG. 9 mainly shows an operation regarding a unicast packet. FIG. 10 shows a procedure after the branch for a multicast packet.

The processing flow of FIG. 9 comprises steps 7-1 to 7-12.

Packets received by the switching hub apparatus 4-1 via the ports 4-12 to 4-16 (step 7-1) are transferred to the LANCs 4-7 to 4-11 corresponding to the respective packets.

Each of the LANCs 4-7 to 4-11 to which is any packet is transferred stores the received packet into the buffer unit 4-6 through the internal bus 4-17 and transmits a limit signal to notify the switching control unit 4-2 of the reception of the packet to the switching control unit 4-2 via the signal lines 4-19 to 4-23 (step 7-2).

When the limit signal is received, the switching control unit 4-2 discriminates whether the packet stored in the buffer unit 4-6 is a unicast packet or a multicast packet (step 7-3).

The discrimination is performed by checking the transmission destination MAC address in the packet.

When a result of the discrimination at step 7-3 indicates the unicast packet, step 7-4 is executed. When it indicates the multicast packet, the processing routine advances to step 8-1 in FIG. 10.

At step 7-4, the switching control unit 4-2 extracts the transmission destination MAC address and the transmitting source MAC address of the unicast packet stored in the buffer unit 4-6 and compares them.

When a comparison result indicates that the transmission destination MAC address and the transmitting source MAC address are identical, the packet stored in the buffer unit 4-6 is abandoned (step 7-9). When they differ from each other, a transmission port number is searched from the address table stored in the address table holding unit 4-3 on the basis of the transmission destination MAC address of the packet (step 7-5). If the same address as the transmission destination MAC address is found, the transmission port number is determined and, if it is not found, step 7-8 is executed.

If it is found, the determined transmission port number and the reception port number are compared and, if a comparison result indicates that the transmission port number and the reception port number differ, the relevant unicast packet is read out from the buffer unit 4-6 and sent to the port of the transmission port number (step 7-6).

If the comparison result in step 7-6 indicates that the transmission port number and the reception port number are identical, a network identifier is searched from the network identification table held in the network identification table holding unit 4-4 on the basis of the transmission port number, thereby obtaining the network identifier corresponding to the transmission port number (step 7-7).

When the network identifier is equal to "0", the packet stored in the buffer unit 4-6 is abandoned (step 7-9). If it is equal to "1", the packet is sent to the LANC corresponding to the transmission port number (step 7-10).

When the transmission destination MAC address cannot be found in the search of the address table at step 7-5, a network identifier is searched from the network identification table on the basis of the reception port number, thereby obtaining the network identifier corresponding to the reception port number (step 7-8).

As described above, when the packet transmitted from any of the terminal apparatuses in the LAN system 30 is received by the corresponding port of the switching hub apparatus 4-1, the additional registration to the address table is automatically performed. In the stable operating state of the LAN system 30, therefore, an occurrence frequency of the branch from step 7-5 to step 7-8 is usually fairly smaller than that of the branch from step 7-5 to step 7-6. The branch to step 7-8 occurs, for example, just after the new terminal apparatus is connected to port and when the terminal apparatus does not yet transmit any packet at all, or the like.

When the network identifier is equal to "0" in step 7-8, all of the ports other than the reception port are set to the transmission ports and the packet read out from the buffer unit 4-6 is transmitted to the LANC corresponding to the transmission port (step 7-12). This corresponds to a situation such that it is unknown to which port the terminal apparatus on the unicast destination side is connected, and it relates to the operation to realize the relevant unicast.

When the network identifier is equal to "1", contrarily, all of the ports including the reception port are set to the transmission ports and the packet read out from the buffer unit 4-6 is transmitted to the LANC corresponding to the transmission port (step 7-11).

For example, now assuming that when the unicast packet is transmitted from the terminal apparatus 4-24 to the terminal apparatus 4-25 arranged in the same cascade, the address table is in the state of FIG. 7B and the network identification table is in the state of FIG. 8B, a port number is searched from the address table on the basis of the transmission destination MAC address "M25" which the packet received by the port 4-13 (port No. "1") as mentioned above has, thereby obtaining the port number "1".

Since the number that is equal to the reception port number is obtained as a transmission port number, the switching control unit 4-2 searches a network identifier from the network identification table of FIG. 8B. When the network identifier of "1" is obtained by the search, the switching hub apparatus 4-1 recognizes that the network connected to the port 4-13 is based on the cascade connection.

Since it is known by this recognition that the packet is the packet to the terminal apparatus in the same cascade, this packet is supplied to the LANC 4-8 and transmitted from the same transmission port 4-13 as the reception port.

In this cascade, since the operation similar to that of the network connecting circuit 2-11 (LANC 11-34) is performed, the terminal apparatus which receives the packet is only the destination terminal apparatus 4-25.

The branch (NO in step 7-3) for the multicast packet from step 7-3 will now be described with reference to FIG. 10. A processing flow of FIG. 10 comprises steps 8-1 to 8-3.

In FIG. 10, to realize a multicast, the multicast packet is first transmitted to all ports other than the reception port (step 8-1).

After that, the processing routine advances to a process for the reception port. This is because when the network connected to the reception port is cascade, unless the packet is transmitted to the terminal apparatus other than the transmitting source among the terminal apparatuses constructing the cascade, the multicast to be transmitted to all of the terminal apparatuses cannot be realized.

The network identification table is searched on the basis of the port number of the reception port and when the corresponding network identifier is equal to "0", the processing routine is finished (NW identifier=0 in step 8-2).

"0" of the network identifier denotes that the connection is not the cascade connection. This is because since the terminal apparatus connected to the port is only the terminal apparatus on the transmitting source side, there is no need to transmit the packet to this port.

"1" of the network identifier denotes the cascade connection and shows that the terminal apparatuses other than the transmitting source terminal apparatus are also connected to the reception port.

When the network identifier is equal to "1", the switching control unit 4-2 searches the address table in FIG. 7B, checks the MAC address of the terminal apparatus connected to the reception port, and rewrites the transmission destination MAC address of the multicast packet to the MAC address checked here.

By once performing the rewriting operation, one unicast packet to be transmitted to the relevant port is formed.

When there are a plurality of MAC addresses which were checked and obtained (in the case where three or more terminal apparatuses are connected to the relevant port), the unicast packets in which only the transmission destination MAC addresses differ, namely, the unicast packets of only the number obtained by subtracting 1 from the number of obtained MAC addresses (namely, subtracting the number of MAC addresses of the transmitting source terminal apparatuses) are formed and transmitted from the reception port to the cascade by the LANC corresponding to the reception port (step 8-3).

By the same function as that of the network connecting circuit 2-11, each terminal apparatus cascade connected to the reception port except for the transmitting source terminal apparatus receives the packet to the self terminal among the unicast packets, so that the multicast is realized.

For example, when the terminal apparatus 4-24 in FIG. 6 transmits the multicast packet to perform the multicast, the multicast packet is once stored in the buffer unit 4-6 via the port 4-13.

Now, assuming that the network identification table is in the state of FIG. 8B when the address table is in the state of FIG. 7B, as mentioned above, the multicast packet received by the port 4-13 (port No. "1") is transmitted to all of the ports 4-12 and 4-14 to 4-16 other than the reception port 4-13 via each LANC. This transmission is performed by the switching control unit 4-2.

Further, with respect to the port No. "1" in which the reception port and the transmission port coincide, the switching control unit 4-2 searches the network identification table of FIG. 8B on the basis of the port No. "1", thereby obtaining the network identifier "1".

Subsequently, the switching control unit 4-2 also searches the address table of FIG. 7B on the basis of the port No. "1", thereby obtaining the MAC addresses "M24" and "M25". Between them, since "M24" is equal to the transmitting source MAC address of the multicast packet, it is excluded and "M25" is written into the transmission destination MAC address of the multicast packet, so that the unicast packet for cascade is obtained.

Since the transmission destination MAC address obtained for cascade is only one address "M25", the number of unicast packets for cascade is equal to 1 in this example.

The unicast packet for cascade is transmitted from the port 4-13 through the LANC 4-8.

Owing to the function of the network connecting circuit 2-11 or the like mentioned above, in the cascade, the unicast packet is received only by the terminal apparatus 4-25.

The multicast transfer is completed by the reception of the unicast packet.

According to the embodiment, since the cascade connection can be incorporated and the packet can be transmitted and received among the terminal apparatuses in the same cascade while suppressing the traffic, the number of terminal apparatuses which can be enclosed in the LAN is large as compared with the number of ports and a using efficiency of resources of the switching hub apparatus is high.

Specifically speaking, the network configuration can be simplified by uniting the LAN network using the star type network connecting system and the LAN network using the cascade type network connecting system. The costs to introduce the network or the costs for maintenance and management such as expansion and the like can be reduced.

Even in the case of using the network connecting circuit (2-11 or the like) in FIG. 3 similar to the conventional one, the transmission and reception of the packet among the terminal apparatuses arranged in the same cascade can be performed through the switching hub apparatus.

In the LAN system, therefore, all of the unicast transfer and multicast transfer can be perfectly realized.

By using the switching hub apparatus, the user of the network and the terminal apparatus does not need to be conscious of a difference between the star type terminal apparatus and the cascade type terminal apparatus. That is, an arbitrary terminal apparatus in the LAN system can be connected to an arbitrary port of the switching hub apparatus, and there is no restriction and a degree of freedom is high upon establishment and operation of the LAN.

Further, in the switching hub apparatus, by identifying the network to be connected to each port and transmitting the packet only to the necessary port upon reception of the unicast packet, it is possible to prevent the increase in traffic to the network and the reception of the packet by the terminal apparatuses other than the necessary terminal apparatus. A communicating efficiency is high.

When the multicast packet is received from the cascade type terminal apparatuses connected to one port, the switching hub apparatus not only transmits the data to the other port of the switching hub but also converts the multicast packet to the unicast packet and transmits it to the terminal apparatuses other than the transmitting source terminal apparatus connected to the reception port, thereby enabling the transmission and reception of the multicast packet between the cascade type terminal apparatuses which were impossible hitherto to be performed.

The embodiment has been described with respect to the multicast in the special case of selecting all of the terminal apparatuses in the LAN system 30. Since the multicast has the same operation as that of the broadcast in this meaning, the description of the multicast in the embodiment can be applied as an explanation of the broadcast as it is.

In the case of processing a general multicast of selecting only the limited terminal apparatus in the LAN system 30, the operation as mentioned above is performed with regard to only the terminal apparatus designated by the transmission destination MAC address of the packet.

In the case of the general multicast, since it is not always necessary to perform the turnback transfer of the packet to the cascade, a process to specify the terminal apparatus on the multicast destination side is introduced between step 7-3 in FIG. 9 and step 8-1 in FIG. 10, and the processes in steps 8-1 to 8-3 are executed limitedly to the port connected to the network portion including the multicast destination terminal apparatus.

The form of the network to be connected to each port of the switching hub apparatus 3-1 is not limited to that mentioned above but, for example, it is also possible to provide a plurality of ports to connect the cascade. Although the number of ports of the switching hub apparatus 3-1 has been limited to 5, it can be also set to an arbitrary value other than 5.

In FIG. 6 of the embodiment, although the buffer unit 4-6, address table holding unit 4-3, network identification table holding unit 4-4, and cascade IP address holding unit 4-5 have been arranged in different memory blocks, all of them can be arranged in the same memory, a part of them can be arranged in the same memory, or they can be arranged in different memory blocks.

Further, in the embodiment, a store and forward system of performing the switching process after all packets are stored in the buffer unit 4-6 has been used as an example of the switching system of the packet, however, it is also possible to use a cut and through system of performing the switching process at a point when only a part (including the transmission destination address portion and the transmitting source address portion) of the packets is extracted and stored can be also used.

In the embodiment, the method of identifying the network from the transmitting source IP address included in the reception packet has been shown as means for identifying the network to be connected to each port of the switching hub apparatus. The connecting network can be also identified by a communication of a recognition dedicated packet by software between the switching hub apparatus and the cascade type LAN connection corresponding terminal.

Further, although the example of the switching hub apparatus has been described in the embodiment, the invention can be applied to a hub apparatus which does not have the switching function.

This is because even in the hub apparatus, hitherto, since it does not have the turnback transfer function in which the reception port is used as a transmission port, there is also a problem such that the packet cannot be transmitted and received between the terminal apparatuses arranged in the same cascade, and this problem can be solved by the invention.

Owing to the construction of the network connecting circuit 2-11 in FIG. 3, even in the case of the non-switching hub apparatus or switching hub apparatus, since it can be connected in a manner similar to the terminal apparatus 2-2, all of the component elements of the cascade are not necessarily the terminal apparatuses 3-3 to 3-6, etc. The terminal apparatus 3-4 or 3-5 in FIG. 3 can be exchanged for a switching hub apparatus or non-switching hub apparatus.

For example, a cascade line in which the terminal apparatuses and the switching hub apparatus mixedly exist or a cascade line comprising a plurality of switching hub apparatuses can be also used.

That is, the invention can be widely applied to a hub apparatus which has a plurality of ports for connecting a network portion including one or a plurality of communicating apparatuses and relays the transmission and reception of a communication packet between the communicating apparatuses through the ports or applied to a network system having the hub apparatus as mentioned above.

According to the invention as mentioned above, when a plurality of communicating apparatuses are arranged in one network portion, the communicating apparatuses in the same network portion can transmit and receive the communication packet through the hub apparatus. Moreover, an increase in traffic occurring by the transmission and reception of the communication packet is merely an increase amount corresponding to the effective communication and can be suppressed to the minimum amount.

What is claimed is:

1. A hub apparatus which has a plurality of ports connecting a network portion including one or a plurality of communicating apparatuses and relays transmission and reception of a communication packet between said communicating apparatuses through said ports, comprising:

port information storing means for storing, every said port, port information regarding said network portion which includes at least information indicating whether the number of communicating apparatuses which said network portion connected to each port is equal to one or a plural number, and means for determining communicating forms of transmission, non-transmission, and a state of the communication packet for transmitting on the basis of said port information corresponding to the port to which said communication packet is sent.

2. An apparatus according to claim 1, wherein the network portion connected to at least one of said plurality of ports is constructed by a plurality of communicating apparatuses, each of said communicating apparatuses has first and second network connecting terminals, between two adjacent communicating apparatuses, a second network connecting terminal of one of said two communicating apparatuses and a first network connecting terminal of the other communicating apparatus are connected through a network cable, thereby constructing a cascade, said port information includes at least address port information in which an apparatus address that is peculiar to the communicating apparatus constructing said network portion connected to each port is shown so as to correspond to said port, and cascade identification information showing whether said network portion is said cascade or not, and when it is detected that said communication packet requests a transmission to the other communicating apparatus in the same cascade on the basis of said address port information and said cascade identification information, information showing that said communication packet is transmitted to the same port as the port which received said communication packet is included in said communicating form.

3. An apparatus according to claim 2, further comprising:

unicast processing means for performing a unicast of a different communicating form in accordance with said port information when said communication packet requests a unicast; and multicast processing means for performing a multicast of a different communicating form in accordance with said port information when said communication packet requests a multicast.

4. An apparatus according to claim 3, wherein said unicast processing means comprises:

address comparing means for comparing a transmission destination address and a transmitting source address included in said communication packet and discriminating whether said addresses are a same address or different addresses;

packet abandoning means for abandoning said communication packet when it is determined by said address comparing means that said addresses are the same address and for not abandoning said communication packet when it is determined that said addresses are the different addresses;

address solving means for, when it is determined by said address comparing means that said addresses are the different addresses, collating the transmission destination address included in said received communication packet with said address port information, and when the same address as said transmission destination address is found, selecting a port corresponding to said address as a transmission port candidate to transmit said communication packet to said network portion;

transmission and reception port comparing means for comparing said selected transmission port candidate with the reception port which received said communication packet and discriminating whether they are a same port or different ports;

packet transmitting means for transmitting said communication packet by using said transmission port candidate as a transmission port when it is determined that said ports are the different ports; and a cascade discriminating means for unicast for referring to said cascade identification information when it is determined that the ports are the same port, transmitting said communication packet by using said transmission port candidate as a transmission port when the network portion connected to said transmission port candidate is a cascade, and not transmitting said communication packet when said network portion is not the cascade.

5. An apparatus according to claim 3, wherein said multicast processing means comprises:

ordinary multicast executing means for performing an ordinary multicast operation to transmit said communication packet to a port to which the communicating apparatus on a multicast destination side that is designated by a transmission destination address of said communication packet is connected other than the reception port of said communication packet;

turnback discriminating means for discriminating whether a turnback transfer in which the reception port is set to the transmission port is performed or not in accordance with whether the reception port of said communication packet is included in the port to which the communicating apparatus on said multicast destination side is connected or not;

cascade discriminating means for multicast for discriminating whether the network portion connected to the reception port which received said communication packet is a cascade or not on the basis of said cascade identification information in the case of performing said turnback transfer; and transmission destination address rewriting means for, when said network portion is the cascade, rewriting the transmission destination address of said communication packet to an address to designate each communicating apparatus and turning back and transferring said address to said reception port in order to transmit said communication packet to each of the communicating apparatuses which are the communicating apparatuses other than the communicating apparatus of a transmitting source side of said communication packet and correspond to said multicast destinations among said plurality of communicating apparatuses constructing said network portion.

6. A network system comprising:

the hub apparatus according to claim 1; and communicating apparatuses constructing a network portion connected to each port of said hub apparatus.

* * * * *